Patented May 11, 1943

2,319,187

UNITED STATES PATENT OFFICE 2,319,187

CHEESE EMULSIFICATION

James D. Ingle, Chicago, Ill., assignor to Industrial Patents Corporation, Chicago, Ill., a corporation of Delaware No Drawing. Application October 30, 1939, Serial No. 301,944

13 Claims. (Cl. 99—115)

This invention relates to a method of manufacturing processed cheese.

One of the objects of this invention is to provide a method of softening casein in cheese.

Another object of this invention is to provide a method of preparing a cheese product having an exceedingly smooth body and texture.

Another object of this invention is to provide a method of preparing pasteurized processed cheese which possesses a natural or true flavor which is not bound up in the cheese as it is in cheese made with the commonly known emulsifying agents.

Other objects and advantages of this invention will become apparent from the description and claims which follow.

The present invention contemplates the use of certain specific ammonium salts as emulsifying or fluxing agents in the preparation of processed cheese. These ammonium salts are ammonium metaphosphate, diammonium disodium pyrophosphate, and mixtures of the enumerated salts. The presence of various materials in cheese products does not affect adversely the action of the emulsifying agents.

In the manufacture of processed cheese, a normally solid cheese is comminuted or finely divided and placed in a suitable vessel provided with a steam jacket. The cheese mass is heated in the vessel to a suitable pasteurizing temperature and is maintained at this temperature for a short period of time. During the heating and pasteurizing treatment, the cheese mass is constantly agitated.

Upon cooling of the mass, the cheese generally does not set to a firm, solid body, and the resulting product does not possess the requisites for a good slicing cheese. Under these conditions the cheese becomes grainy and sandy and presents an unattractive appearance.

Various emulsifying agents or fluxing agents have been proposed, including tartrates, citrates, lactates, and certain types of phosphates, particularly sodium polyphosphates.

I have discovered that the ammonium salts enumerated above possess an unusual property of softening the casein of cheese to produce a processed cheese product having a very smooth body and texture, and an excellent flavor. These emulsifying agents permit the production of a pasteurized processed cheese which possesses a natural cheese flavor which is not bound up in the cheese as it is in cheese made with the usual emulsifying agents of the prior art.

The flavor of processed cheese is dependent upon the proportion of aged cheese employed in the preparation of the processed cheese and on the type of cheese emulsion. The type of emulsion which is produced is, in turn, dependent upon the emulsifying agent employed. Certain emulsifying agents produce a product which is more or less gummy when chewed, and the natural or true cheese flavor is not readily apparent, and the flavor is said to be bound up in the cheese. In aged cheese which has not been processed and in processed cheese prepared in accordance with the present invention, the natural or true cheese flavor becomes readily apparent as soon as the cheese is masticated, and it is said that the flavor is not bound up in the cheese.

Although the emulsifying agents may be used in a wide variety of cheese, my invention will be illustrated specifically by the following example as applied to Cheddar cheese.

A quantity of Cheddar cheese is finely divided or comminuted and placed in a steam jacketed vessel. The cheese is heated by passing steam through the jacket of the vessel and a small quantity of the emulsifying agent and water added to the cheese. The proportion of emulsifying salt and water is not critical, and I prefer to add from 1 per cent to 5 per cent of the emulsifying salt and about 10 per cent water. The emulsifying salt and water are preferably added as a solution of the emulsifying agent in the water. It is not essential, however, that the emulsifying agent be dissolved in water before adding it to the cheese. The water aids in obtaining a better distribution of the emulsifying agent in the cheese mass.

The mixture is thoroughly agitated throughout the heating period, and heating is continued until the mass reaches a pasteurizing temperature, which may be from 130 degrees to 180 degrees Fahrenheit. The mass is maintained at the pasteurizing temperature for a period of time sufficient to pasteurize the cheese completely, which may be from one half hour to one hour. The pasteurization temperature and time are variable, as is well known. The mass is then discharged into molds and allowed to cool.

The pasteurized processed cheese possesses a much smoother body and texture than pasteurized processed cheese prepared with the prior art emulsifying agents, and possesses a natural cheese flavor which is not bound up in the cheese as it is in cheese made with the common emulsifying agents.

I claim:

1. In the method of processing cheese the steps which comprise adding to and incorporating in cheese a small quantity of a substance selected from the group consisting of ammonium metaphosphate, diammonium disodium pyrophosphate, and mixtures of these salts, and pasteurizing the mass.

2. In the method of processing cheese the steps which comprise adding to and incorporating in cheese a small quantity of ammonium metaphosphate, and pasteurizing the mass.

3. In the method of processing cheese the step which comprises adding to and incorporating in cheese a small quantity of diammonium disodium pyrophosphate.

4. The method of processing cheese which comprises adding to cheese a small amount of a substance selected from the group consisting of ammonium metaphosphate, diammonium disodium pyrophosphate, and mixtures of these salts, agitating the mass, and heating the mass to a pasteurizing temperature.

5. The method of processing cheese which comprises adding to cheese a small amount of ammonium metaphosphate, agitating the mass, and heating the mass to a pasteurizing temperature.

6. The method of processing cheese which comprises adding to cheese a small amount of diammonium disodium pyrophosphate, agitating the mass, and heating the mass to a pasteurizing temperature.

7. The method of processing cheese which comprises adding to cheese from about 1 per cent to about 5 per cent of a substance selected from the group consisting of ammonium metaphosphate, diammonium disodium pyrophosphate, and mixtures of these salts, agitating the mass, and heating the mass to a temperature of from about 130 degrees to about 180 degrees F.

8. The method of processing cheese which comprises adding to cheese from about 1 per cent to about 5 per cent ammonium metaphosphate, agitating the mass, and heating the mass to a temperature of from about 130 degrees to about 180 degrees F.

9. The method of processing cheese which comprises adding to cheese from about 1 per cent to about 5 per cent diammonium disodium pyrophosphate, agitating the mass, and heating the mass to a temperature of from about 130 degrees to about 180 degrees F.

10. The method of processing cheese which comprises adding to cheese from about 1 per cent to about 5 per cent of a substance selected from the group consisting of ammonium metaphosphate, diammonium disodium pyrophosphate, and mixtures of these salts, and about 10 per cent water, agitating the mass, heating the mass to a pasteurizing temperature of from about 130 degrees to about 180 degrees F., maintaining the mass at a pasteurizing temperature until pasteurization is complete, and transferring the mass into molds and allowing the mass to cool in the molds.

11. As an article of manufacture, a processed cheese product comprising pasteurized cheese and a small quantity of a substance selected from the group consisting of ammonium metaphosphate, diammonium disodium pyrophosphate, and mixtures of these salts.

12. As an article of manufacture, a processed cheese comprising pasteurized cheese and a small quantity of ammonium metaphosphate.

13. As an article of manufacture, a processed cheese comprising pasteurized cheese and a small quantity of diammonium disodium pyrophosphate.

JAMES D. INGLE.